United States Patent
Hillmann et al.

(10) Patent No.: US 9,892,306 B2
(45) Date of Patent: Feb. 13, 2018

(54) DEVICE AND METHOD FOR THE DIRECT OPTICAL RECORDING OF LIVE SKIN AREAS

(71) Applicant: JENETRIC GmbH, Jena (DE)

(72) Inventors: Juergen Hillmann, Jena (DE); Joerg Reinhold, Jena (DE); Dirk Morgeneier, Jena (DE)

(73) Assignee: JENETRIC GmbH, Jena (DE)

( * ) Notice: Subject to any disclaimer, the term of this patent is extended or adjusted under 35 U.S.C. 154(b) by 0 days.

(21) Appl. No.: 15/264,226

(22) Filed: Sep. 13, 2016

(65) Prior Publication Data

US 2017/0076133 A1    Mar. 16, 2017

(30) Foreign Application Priority Data

Sep. 14, 2015   (DE) ........................ 10 2015 115 484

(51) Int. Cl.
  *G06K 9/00*      (2006.01)
  *G06K 9/20*      (2006.01)
  (Continued)

(52) U.S. Cl.
  CPC ..... *G06K 9/00033* (2013.01); *G06K 9/00013* (2013.01); *G06K 9/00906* (2013.01);
  (Continued)

(58) Field of Classification Search
  CPC .............. G06K 9/0006; G06K 9/0004; G06K 9/00067; G06K 9/0008; G06K 9/00087; G06K 9/00093
  See application file for complete search history.

(56) References Cited

U.S. PATENT DOCUMENTS 4,394,773  A    7/1983  Ruell
5,325,442  A    6/1994  Knapp
(Continued)

FOREIGN PATENT DOCUMENTS

DE    19958378 A1   11/2000
DE    10002767 A1   7/2001
(Continued)

*Primary Examiner* — Wesley Tucker
(74) *Attorney, Agent, or Firm* — Patentbar International, P.C.

(57) ABSTRACT

A device and method for direct optical recording of live skin areas, particularly of fingerprints or handprints, is disclosed. A novel possibility for direct optical recording of human skin prints with forensic quality where interference through ambient light is excluded is achieved in that, from a skin area to be recorded, image data of a calibration image generated under homogeneous illumination from an areal source and ambient light that may be present are read out from the sensor array, an adapted illumination pattern is calculated by means of the stored calibration image such that, through application of the adapted illumination pattern, a two-dimensionally structured illumination pattern is generated to minimize the influence of the ambient light and to homogenize the illumination at least of the deposited skin print, wherein an illumination array is controlled in individual light-emitting elements or in groups of light-emitting elements with the calculated illumination pattern.

18 Claims, 8 Drawing Sheets

(51) Int. Cl.
*G06T 5/00* (2006.01)
*G06T 7/00* (2017.01)

(52) U.S. Cl.
CPC ............ *G06K 9/2027* (2013.01); *G06T 5/009* (2013.01); *G06T 7/0081* (2013.01); *G06T 2207/10152* (2013.01); *G06T 2207/20144* (2013.01); *G06T 2207/20208* (2013.01); *G06T 2207/30196* (2013.01)

(56) References Cited

U.S. PATENT DOCUMENTS

| | | | |
|---|---|---|---|
| 6,128,399 A | 10/2000 | Calmel | |
| 6,327,376 B1 | 12/2001 | Harkin | |
| 7,366,331 B2 | 4/2008 | Higuchi | |
| 7,379,570 B2 | 5/2008 | Shyu et al. | |
| 8,917,387 B1 | 12/2014 | Lee et al. | |
| 9,396,381 B2* | 7/2016 | Yi | G06K 9/00046 |
| 9,659,362 B2* | 5/2017 | Klimovski | G06T 7/001 |
| 2002/0163601 A1 | 11/2002 | Min et al. | |
| 2002/0180585 A1 | 12/2002 | Kim et al. | |
| 2003/0012451 A1* | 1/2003 | Shigeta | H04N 5/367 382/274 |
| 2003/0174870 A1 | 9/2003 | Kim et al. | |
| 2005/0213173 A1 | 9/2005 | Sasaki et al. | |
| 2005/0229380 A1 | 10/2005 | Deconde et al. | |
| 2006/0215887 A1* | 9/2006 | Nishimura | G06K 9/0012 382/124 |
| 2007/0005844 A1* | 1/2007 | Lee | G06F 3/03543 710/62 |
| 2007/0252005 A1 | 11/2007 | Konicek | |
| 2012/0236301 A1* | 9/2012 | Hashimoto | G01N 21/658 356/301 |
| 2012/0321149 A1 | 12/2012 | Carver et al. | |
| 2013/0120760 A1 | 5/2013 | Raguin et al. | |
| 2013/0135453 A1* | 5/2013 | Kanamori | A61B 1/00009 348/65 |
| 2016/0092717 A1 | 3/2016 | Ling | |
| 2017/0046824 A1* | 2/2017 | Klimovski | G06T 7/001 |

FOREIGN PATENT DOCUMENTS

| | | |
|---|---|---|
| DE | 10133823 A1 | 2/2003 |
| DE | 102013106105 A1 | 12/2014 |

\* cited by examiner

DEVICE AND METHOD FOR THE DIRECT OPTICAL RECORDING OF LIVE SKIN AREAS

RELATED APPLICATIONS

This application claims priority to German Patent Application No. DE 10 2015 115 484.6, filed Sep. 14, 2015, which is incorporated herein by reference in its entirety.

FIELD OF THE INVENTION

The invention is directed to a device and a method for direct optical recording of live skin areas, particularly of fingerprints or handprints. It is applied chiefly for personal identification in forensics, international border traffic and in the domain of aviation security.

BACKGROUND OF THE INVENTION

The identification and recognition of persons via biometric features is becoming increasingly important. Aside from other detectable biometric features, the fingerprint and handprint play a prominent role.

In systems for acquiring fingerprints and handprints, one must distinguish between two systems of this type which are used for a verification, i.e., a one-to-one comparison, for example for entry control and access control, and other systems which are used for personal identification, i.e., for recording and searching comparison data in a database administered by government authorities, for example, for border controls, aviation security and for police use.

For the latter systems, there is a great number of demands with respect to quality, resolution and fidelity to the original of the recorded images of skin textures. Further, there is a high degree of standardization based on the requirements catalog of the FBI, on the one hand, to ensure indisputable identification and, on the one hand, to allow comparison between datasets which were recorded by different systems. This requirements catalog includes six important parameters.

First, the systems must have a resolution of either at least 500 ppi (pixels per inch) or at least 1000 ppi. There may be no certification below these resolutions. One of the most important parameters for certification is the contrast transfer function (CTF). In this respect, the requirements catalog defines exactly the minimum value that the CTF must have in the corresponding spatial frequencies in the image. FIG. 7 shows these CTF standards of the FBI for a 500 ppi system as a function of spatial frequency (lp/mm) as a dashed curve (504)—at 10 lp/mm, the contrast must reach at least 25.8%. In case of a 1000 ppi system, a contrast of at least 28% must be achieved at 20 lp/mm. A further important parameter is the signal-to-noise ratio (SNR) which must be at least 42 dB independent from the resolution. Further requirements include low distortion of <1%, the presence of at least 200 different grayscale values and a homogeneously illuminated image field both in the near pixel environment and in the image overall. The last parameter serves as a control for preventing the occurrence of image falsification. This means that unusual artifacts are explicitly looked for in the images to detect image manipulation.

All of the requirement criteria require a balanced and high-quality system design. In an optical system, this means, for example, that the requirements must be satisfied not only by the recording sensor, but also by the illumination and all other components necessary for imaging.

Currently, the optical arrangements chiefly used for acquiring fingerprints and handprints with the high quality requirements corresponding to the requirements catalog of the FBI, for example for forensic purposes or for personal identification at border controls, are based on the principle of frustrated total internal reflection. In this case, owing to mechanical and optical requirements, a prism is used in which the provided surface for recording the print must be larger than the required surface for recording the print. The resulting size of the prism, commonly the largest component in the recording channel, decisively influences the minimum constructional size and minimum mass of a device of this kind. On the other hand, the high image quality allows fast and reliable recognition and identification of persons, particularly for applications in which, along with forensic accuracy (FBI requirements), a high person throughput is expected, e.g., at border controls.

The disadvantages of these types of arrangements with prisms, apart from the size and mass, are the required complex mechanical components and a complicated assembly and adjustment.

Miniaturized arrangements with imaging optics, as in U.S. Pat. No. 7,379,570 B2, generally do not satisfy FBI requirements while still limiting minimization of the devices owing to the space required for the optical beam path. Ultrasonic sensors or piezo sensors as are known, e.g., from U.S. Pat. No. 4,394,773, and capacitive sensors as described, e.g., in U.S. Pat. No. 5,325,442, cannot optically capture fingerprints. Devices based on ultrasonic sensors are not yet commercially available. Up to the present day, existing capacitive sensors in turn are only for capturing one or two fingers. Membrane keyboards as described, for example, in US 2005/0229380 A1 do not satisfy the necessary FBI criteria.

Approaches have already been described in US 2012/0321149 A1 for combining the advantage of high image quality which can be achieved with frustrated total internal reflection with a small constructional size. In the fingerprint sensor disclosed therein, the finger is placed on a transparent substrate, the sensor being located directly under the latter. As is the case in arrangements with prisms, the brightness profile corresponding to the fingerprint comes about in that the skin ridges (further on: ridges) resting on the surface of the substrate frustrate the internal reflection of light from the light source, while there is no contact between skin valleys (further on: valleys) and surface of the substrate and the light from the light source is internally reflected there at the surface of the substrate. Accordingly, a negative image of the fingerprint is formed on the light-sensitive areas of the sensor array. Thus this solution assumes that the upper substrate has a minimum thickness so that the light generates an image of the fingerprint through reflection at the placement surface on the light-sensitive elements of the sensor array. Further, it is necessary that the illumination meets certain requirements with respect to incident direction and aperture angle or collimation, which appreciably increases the technical expenditure on illumination as well as the space requirement. The constructions for illumination presented cannot be implemented for large recording surfaces for more than one or two fingers or, if so, only at considerable expense.

A further concept for a flat construction without imaging optics is described in U.S. Pat. No. 7,366,331 B2. In this case, light is coupled laterally into the finger by means of areal illumination and is guided from the latter to the deposited parts of the skin. But this light guidance functions exclusively for light components in the red spectral range and infrared spectral range. Shorter-wavelength light, starting from the green spectral region, is absorbed by the blood in the finger. If the finger contacts the transparent layer between finger and sensor, light from the ridges preferably couples into the transparent layer and can accordingly be detected by the surface sensor. Thus this concept stipulates illumination wavelengths within the transparency range of the finger (NIR range and IR range) and entails substantial problems with respect to ambient light.

The use of IR filters and IR illumination proposed in U.S. Pat. No. 7,366,331 B2 mitigates these problems but only at the cost of reduced sensitivity of the utilized sensors and higher absorption of the finger, which worsens the signal-to-noise ratio. Utilized narrowband spectral filers must be adapted very precisely to the wavelength of the illumination and generate additional expense. Further, the lateral illumination causes problems with the homogeneity of the lighting; in particular, it prevents the simultaneous capture of more than one finger because the fingers would shadow one another. Therefore, this concept is only suitable for capturing an individual finger. Further, a light shield is needed in order to prevent portions of the illumination from reaching the sensor directly. The lateral illumination and light shield increase the size of the device and make it costlier, less flexible and more susceptible to malfunction.

SUMMARY OF THE INVENTION

It is the object of the invention to find a novel possibility for direct optical recording of human skin prints, in particular fingerprints and/or handprints as well as four-finger prints, with the quality stipulated in accordance with FBI standards in which interference through ambient light is excluded and no passive shading measures are needed. An expanded object consists in that proof of or exclusion of finger falsification is possible and can be integrated in a simple manner.

According to the invention, the above-stated object is met in a method for optical recording of skin prints, particularly fingerprints and handprints, by means of a direct optical scanner with the following steps:

placing a skin area to be recorded on the placement surface of the scanner, reading out and storing image data of a calibration image from the sensor array, which calibration image is generated under homogeneous illumination from an areal source and ambient light that may be present, calculating an adapted illumination pattern through application of image processing algorithms to the stored calibration image such that, through application of the adapted illumination pattern, a two-dimensionally structured illumination pattern is generated to minimize the influence of the ambient light and to homogenize the illumination at least of the deposited skin print 102, controlling an illumination array with the calculated illumination pattern, this illumination array being controllable in individual light-emitting elements or in groups of light-emitting elements, reading out and storing image data of an image of the deposited skin area generated with adapted illumination pattern.

The calculation of the adapted illumination pattern from the calibration image advantageously includes the following steps:

calculating an image background without the details of the skin print through the application of image processing algorithms, adapting image information containing at least brightness value range and image size to technical parameters of the illumination array, and applying image processing algorithms which are provided at least for scaling image regions and for taking into account the propagation characteristic of the light in the deposited skin area.

Adapting the image information to the technical parameters of the illumination array advisably includes at least image processing algorithms from the group comprising scaling, offset and inversion.

It has proven advantageous that the readout of the calibration image data and the calculation of the adapted illumination patterns include the following steps:

reading out image data of a calibration image from the sensor array by means of the internal computing unit, which calibration image is generated under homogeneous illumination, storing the read-out image data in a storage module connected directly to the computing unit, and calculating an adapted illumination pattern through application of image processing algorithms to the stored calibration image.

The readout of the calibration image data and the calculation of the adapted illumination patterns are advisably carried out by means of an internal computing unit, e.g., signal processor, microcontroller or a freely programmable logic circuit (FPGA).

The calculated adapted illumination pattern for recording the skin prints through the controllable illumination array is preferably displayed as a light-dark distribution.

In addition, at least one comparison image can be captured for live finger detection, for which the illumination array is spatially limited to a part of the skin area to be recorded or is completely switched off in order to utilize the effect of ambient light in a selective manner.

Further, it may be advisable that at least one comparison image is recorded, for which the illumination array is switched off in individual regions of the skin area to be recorded in order to utilize image information of transitional areas of the skin print between a switched on and switched off light source for live finger detection.

Further, at least one comparison image for live finger detection can advantageously be recorded with a changed wavelength spectrum of the illumination array.

In a device for optical recording of live skin areas, particularly fingerprints or handprints, containing a layer body with a sensor layer in which light-sensitive elements are arranged in a two-dimensional, regular pixel grid and with a placement surface for at least one skin area to be recorded, which placement surface is an outer surface of the layer body parallely opposed to the two-dimensional pixel grid of light-sensitive elements, the above-stated object is further met in that the layer body is formed in such a way that the light-sensitive elements have a distance from the skin area to be recorded of less than the mean pixel spacing defined by the pixel grid, in that a light source is provided and is formed such that light components of the light source from the direction of the sensor layer can be coupled through the placement surface into the skin area to be recorded, wherein all of the layers of the layer body which are located between the light source and the placement surface transmit at least portions of light of a required wavelength range, and the light source has regions which can be controlled individually or in groups and which allow an adapted, structured illumination pattern at least for the skin area to be recorded to compensate for the influence and interference of the ambient light of a calibration image of the skin print recorded with homogeneous illumination, and in that a computing unit for calculating an adapted illumination distribution for controlling the separately controllable regions for generating the adapted illumination pattern is connected to the sensor layer and to the illumination array.

A spectral filter is advantageously provided between the light-sensitive elements and the placement surface and is transparent at least for wavelength components smaller than 600 nm. The spectral filter can be arranged between the sensor layer and the placement surface over the full surface.

Alternatively, it is possible that the spectral filter is only provided between the light-sensitive elements and the deposited skin area such that the illumination of the deposited skin area is not spectrally limited through the filter.

A band pass filter which is transparent at least in the green spectral region and blue spectral region or a low pass edge filter which is transparent for green spectral region and below can advisably be provided as spectral filter, wherein absorptive color filters or interference filters, particularly multilayer interference filters, are preferably used.

The spectral filter is preferably transparent to wavelength components of at least one hemoglobin absorption band from the group comprising Soret band, Hb-alpha band and Hb-beta band.

An illumination array having regularly arranged singular light diodes in a diode matrix, the diodes being LEDs, OLEDs and/or QLEDs, is advisably provided as light source.

It has proven to be advantageous that an additional light source with a different wavelength spectrum than that allocated to the illumination array can be switched on alternatively in order to record a comparison image for live finger detection in case of a deviating comparison wavelength, and narrow band illumination with approximately 500 nm can be used as wavelengths for the comparison when the illumination array is operated with wavelengths around 450 nm. In case no filter layer is provided for spectrally limiting the capture of the deposited object, the narrowband comparison wavelength can amount to around 700 nm when the illumination array is operated regularly in a wavelength range around 450 nm.

The computing unit for calculating the adapted illumination is advantageously an internal computing unit which is arranged on a chip in common with the sensor layer and the illumination unit and which can preferably be constructed in the form of a signal processor, a microcontroller or a freely programmable logic circuit (FPGA).

The invention is based on the fundamental consideration that the greatest problem in direct optical scanners in which the object to be captured (finger, four fingers or hand) is placed on a placement surface directly over the light-sensitive sensor array is the interfering influence of ambient light when, particularly for mobile devices, no constant artificial light or a completely shaded placement surface can be realized.

Illumination and Ambient Light

The interfering influence of ambient light is reduced or compensated according to the invention through adapted (structured) illumination which is controlled in a spatially dependently differentiated manner by a light source arranged below the placement surface for the skin area. The spatially dependent control adapted to this is carried out on the basis of an added image capture as calibration image with the existing ambient light by applying image processing algorithms which calculate a homogeneous illumination for the deposited skin area taking into account the existing ambient light, i.e., which effectively compensate for the ambient light. To this end, the direct optical sensor has a layer construction comprising below the placement surface a layer with regularly arranged light-sensitive elements in a defined pixel grid and a light source which is likewise structured— although not necessarily with the same grid, the structured illumination being organized in a layer so as to be controllable in a spatially dependent manner. Accordingly, the illumination is carried outcoming from direction below the placement surface so that a reflected signal of the skin print contacting the placement surface is detected.

Direct Optical Recording with High Image Quality

The contrast between ridges and valleys of the skin print is essential to achieving the FBI quality standards. This contrast amounts to less than 0.1 on a simple contactless image, for example, of finger minutiae. Owing to the underlying principle of optical recording, a substantially higher ridge-valley contrast is achieved in the arrangement according to the invention. Of the skin area to be recorded on the placement surface, the light reflected by (or backscattered from) the light source can propagate from the ridges (skin ridges directly contacting the placement surface) into the placement surface virtually without reflection losses and can be detected by the light-sensitive elements of the sensor layer. The precondition for this is a slight difference in refractive index between the deposited skin area and the layer forming the placement surface. With current transparent materials having a refractive index of around 1.5 (±0.2), this precondition is sufficiently met because human skin tissue likewise has a refractive index of approximately 1.5.

Only a substantially smaller portion of the backscattered light from the region of the valleys is coupled out of the skin because a difference in refractive index between skin and air of approximately 0.5 causes considerably more reflection. In addition, the portion of the light coupled out of the valleys is in turn reduced through a further reflection at the interface between air and the placement surface. The backscattered light in its entirety can be calculated for different refractive indices of the placement surface and wavelengths of the illumination and gives a ridge-valley contrast of the finger minutiae of 0.5 (±0.1) for the entire optical wavelength range and a refractive index of the layer forming the placement surface of 1.5 (±0.1).

The direct recording is carried out without imaging elements in a highly resolving manner under the condition that the distance between the placement surface and light-sensitive elements of the sensor layer is less than the mean pixel spacing defined by the pixel grid. This criterion is necessary because the contrast transfer function (CTF) worsens with increasing distance owing to the propagation of the back-scattered light between placement surface and sensor layer. Based on the Nyquist theorem, a system of this type requires a period, i.e., a mean pixel spacing, of at least 50.8 µm. If this value is taken as distance between placement surface and sensor, the FBI specifications can no longer be met. Therefore, it must be a valid condition that the distance between the placement surface and the light-sensitive elements of the sensor layer must be smaller than the mean pixel distance.

The invention makes possible a direct optical recording of human skin prints, particularly fingerprints and/or handprints and four-finger prints, with the quality specified according to FBI standards in which interference through ambient light is excluded and no passive shading measures are required. Apart from interfering influences through ambient light, excessively dry or excessively moist finger areas and excessive contact pressure are appreciably reduced or compensated at the same time through the adapted (structured) illumination. The structured illumination also significantly facilitates the detection of falsification (otherwise known as spoofing) and can be integrated in a simple manner.

BRIEF DESCRIPTION OF THE DRAWINGS

The invention will be described more fully in the following with reference to embodiment examples. The accompanying drawings show.

DETAILED DESCRIPTION OF THE PREFERRED EMBODIMENTS

Figure 1:
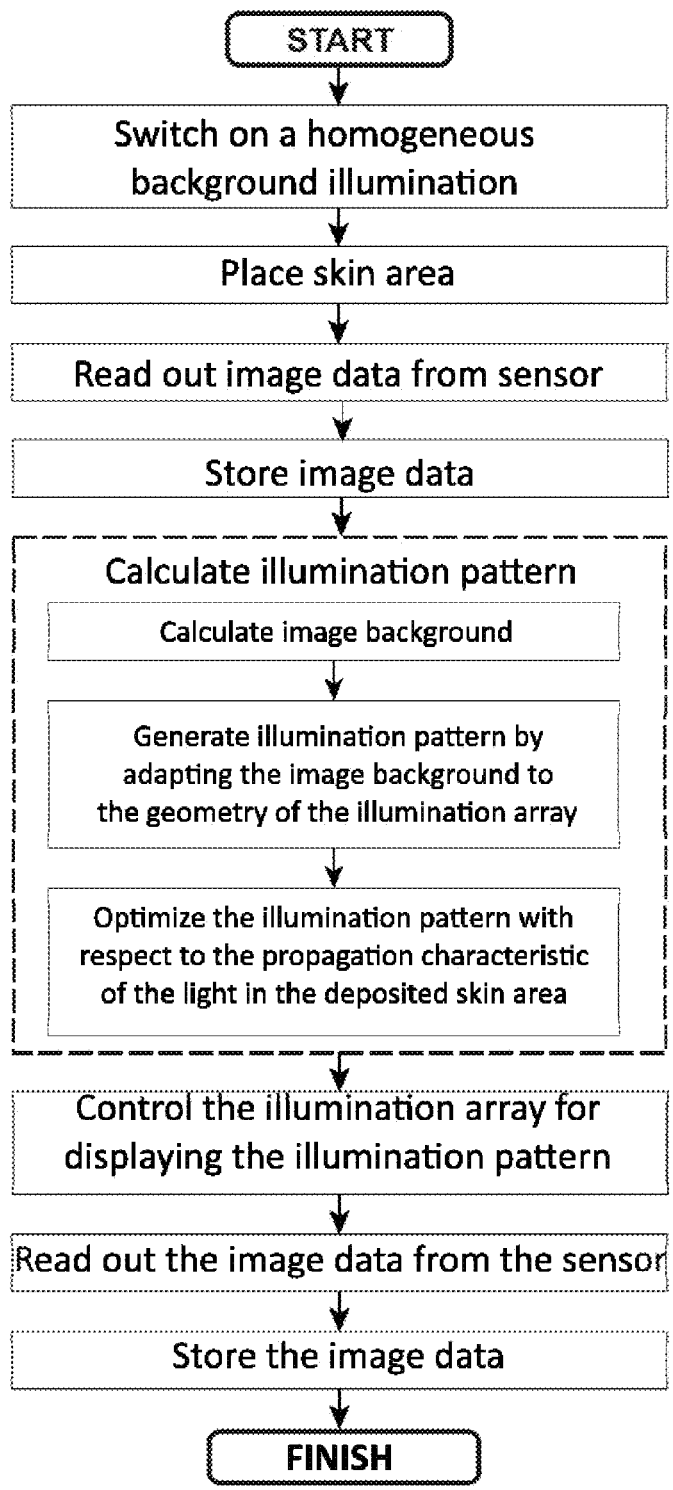
FIG. 1 a flowchart for a basic variant of the method according to the invention.
Figure 9A:
FIGS. 9A-9B are examples of a captured fingerprint detail (FIG. 9A), and of a typical illumination pattern for this fingerprint detail (FIG. 9B)

FIG. 1 schematically shows the application of a structured illumination for reducing the above-described interfering effects. The start is initiated manually by the user or through an automated process by logging the approach of the skin area to be recorded to the placement surface or contact thereof with the placement surface. After the skin area is deposited, a calibration image is recorded with homogeneous illumination and the ambient light present at the instant of recording. A typical skin print of a fingertip is shown in FIG. 9a. For simplicity, the object deposited on the placement surface 103 will be designated—without limiting generality—as finger 102, although handprints and four fingers are also meant. If only the part contacting the placement surface is meant, the term "deposited skin area" is also used synonymously.

Figure 9B:
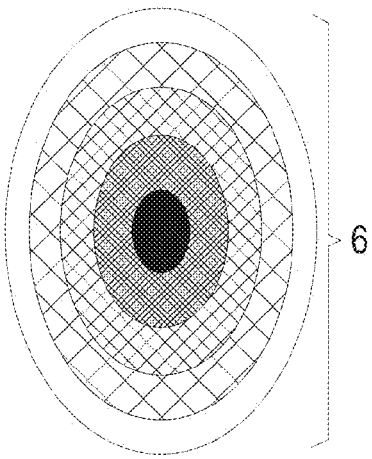

The recorded calibration image is stored and processed by means of image processing algorithms. This result of this processing is an illumination pattern 6 which is used for controlling an illumination device and is generated at the latter. A typical illumination pattern detail for an individual fingertip is shown in FIG. 9b. The black region symbolizes a high illumination intensity which is calculated for controlling, and the white region represents a low illumination intensity. The shaded or patterned regions correspondingly define illumination intensities there between.

The skin area of a finger 102 placed on the placement surface 103 is illuminated in a structured manner with the calculated illumination pattern. This happens in such a way that above-mentioned inhomogeneities are reduced or, ideally, compensated. An image is then captured again, the image data are stored and the process is repeated as needed when errors occur or further fingerprints or handprints are to be acquired.

Generation of an Illumination Pattern by Calculation of Image Background

FIG. 1 shows how a specific illumination pattern is prepared and applied for eliminating interfering effects and optimizing image quality. A step for generating the illumination pattern consists in calculating the image background or reducing the calibration image to the image background. By "image background" is meant the brightness curve behind the detail structures. Regarding the fingerprints, this means that the papillary lines, i.e., the fine images of the ridges and valleys of the fingerprint, are removed from the image. A closing filter, for example, i.e., a combination of minimum filters and maximum filters, can be used for this purpose. In general, the illumination array has at least a different pixel count and a different brightness value range than sensor layer 105. The stored image is adapted to the technical particulars of the illumination matrix. For example, the adaptation involves image processing algorithms such as scaling, offset and inversion. If skin is illuminated by light, the optical response can be described by reflection, transmission, absorption and scattering. The specific propagation characteristic of the light in human tissue or in skin is taken into account through additional algorithms on the image.

In the solution according to the invention, the function of the finger as light guide is not wanted; the light should be backscattered or absorbed so that light from the surroundings does not have an effect on the brightness profile on the sensor through the finger. For this reason, wavelengths that are absorbed by the hemoglobin band in the blood of the finger are preferably used. In this wavelength range, the characteristic penetration depth is less than 0.5 mm.

Figure 11:
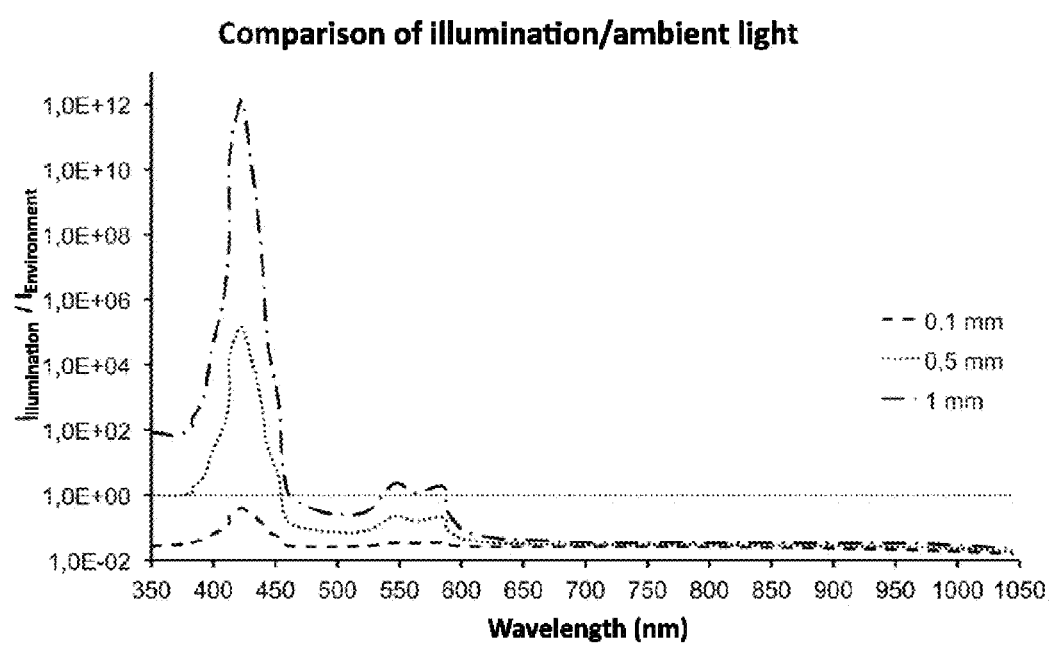
FIG. 11 is a diagram for the ratio of the intensity proportions resulting from artificial illumination and direct sunlight after passing through human tissue of different thicknesses, shown as a function of wavelength.

Accordingly, the finger acts at the same time to shield against ambient light. In FIG. 11, the anticipated ratio of ambient light (direct sunlight) to background illumination is shown as a function of wavelength. In this case, the absorption band of hemoglobin, particularly in the ranges around 420 nm and 560 nm, is clearly seen. The extremely thin layer above the light-sensitive pixel considerably reduces the light penetrating from the side (in contrast to US 20130120760 A1, for example).

The illumination is configured in such a way that all of the details of a fingerprint are sufficiently illuminated. To this end, there can be transparent areas between the light-sensitive elements in the regular pixel grid through which shines a background illumination, or a transparent area around the light-sensitive elements in the regular pixel grid for shining through, or a point light source between the light-sensitive elements with a sufficient density.

No further special requirements are set for the illumination itself. It must contain the wavelengths to which the sensor is sensitive and must have a uniform brightness within certain limits.

Iterative Generation of Illumination Patterns

Figure 2:
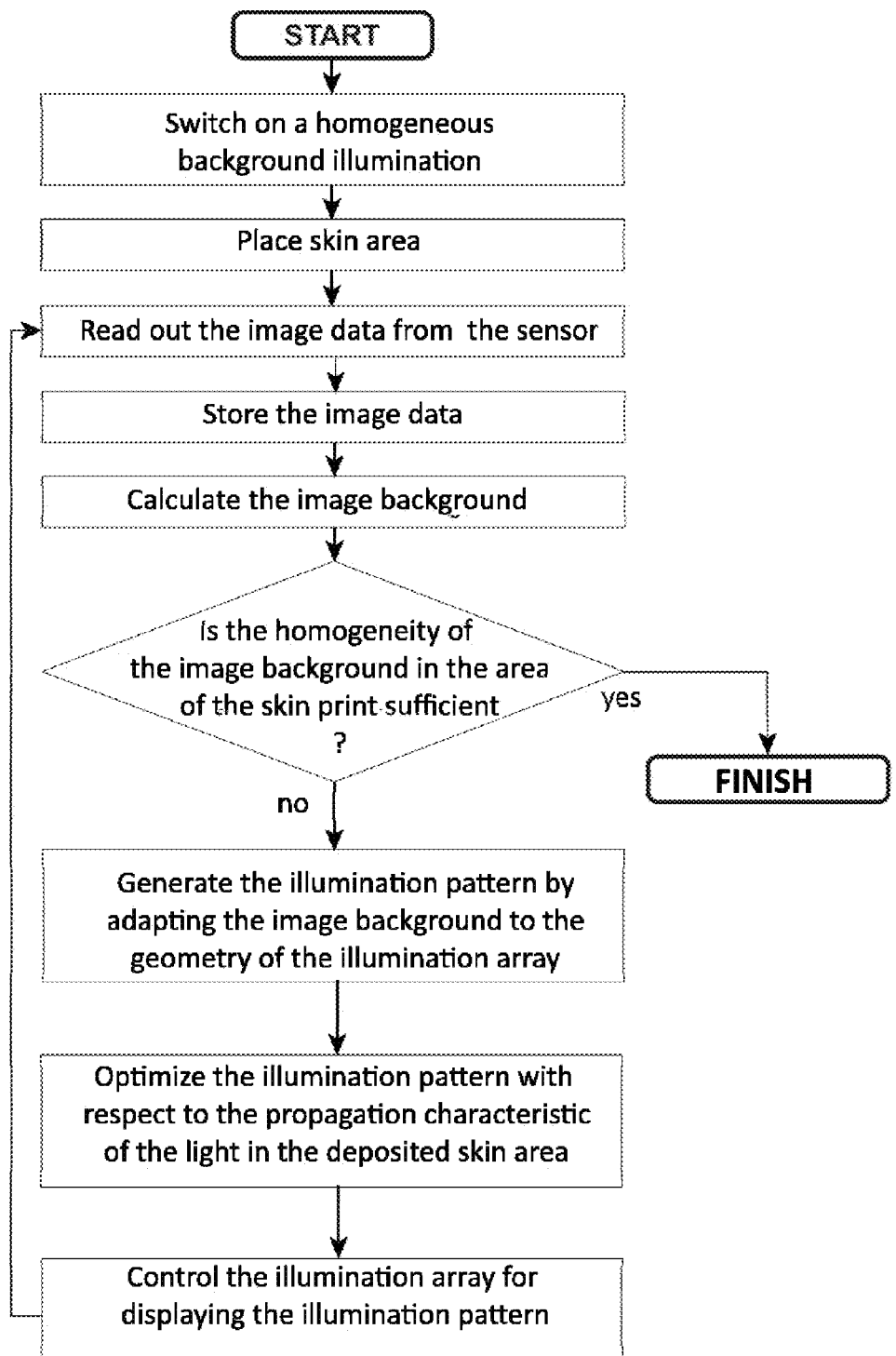
FIG. 2 a flowchart of the method for generating the adapted structured illumination.

FIG. 2 shows an iterative approach for optimizing the illumination pattern 6. In this case, a quality parameter is introduced. This quality parameter describes the homogeneity of the image background in the region of the skin print 102. Accordingly, after calculating the image background, the extent to which interference persists in the recorded image through inhomogeneous skin features or inhomogeneous ambient light is tested. To this end, the variance of the grayscale values around the mean of the image background can be calculated. When a specific stipulation of this parameter is met, the iteration is concluded and the entire process is accordingly terminated. When the stipulation is not met, the process is carried out anew, an illumination pattern 6 is generated, this illumination pattern 6 is optimized and applied, an image is again captured and stored, and the background is again calculated and tested as to whether the quality has improved and the criterion for concluding the process is met or whether a further optimization is to be carried out.

Detection of Falsification (Spoofing)

Figure 3:
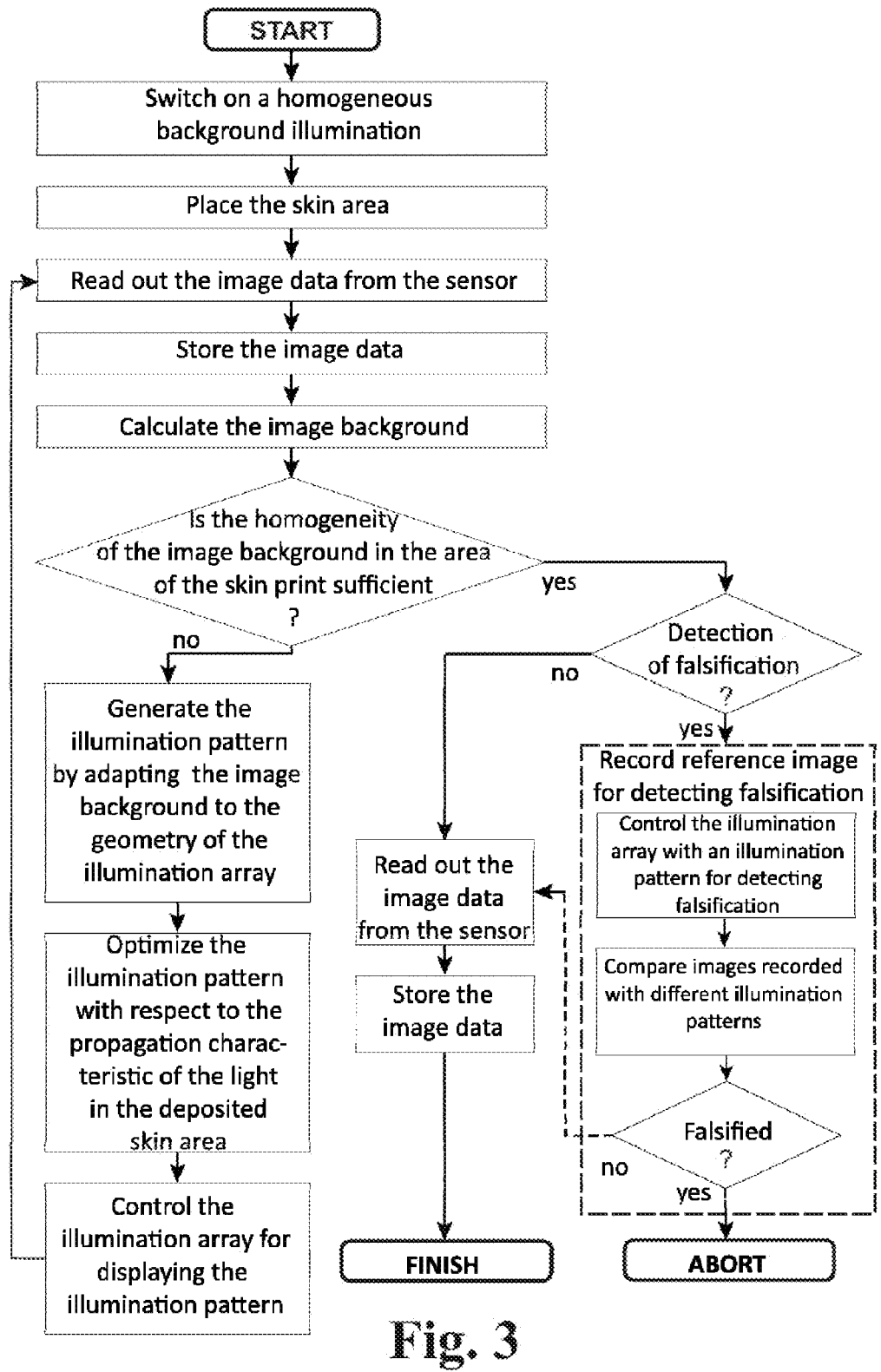
FIG. 3 a flowchart of the method according to the invention in an expanded variant for detecting falsification.

The described process for image optimization through adapted illumination or for reducing interference is shown schematically in FIG. 3, in this case in an iterative variant which is described referring to FIG. 2. In addition, a further process takes place after the optimized image has been recorded. At least one comparison image is recorded for detecting falsification. The special structured illumination can be used for this purpose. A possible concept consists in analyzing the image in the region of the skin print 102 at a light-dark edge of the illumination pattern. Through special scattering processes, the light propagation in the tissue behaves differently than in artificial material. In this way, the falsification can be detected by comparing with stored reference data.

Alternatively or in addition, further information can be obtained through recording at further illumination wavelengths. These illumination wavelengths can be generated either by the above-mentioned illumination unit or by one or more additional light sources. The detection of falsification through these methods is grounded in the fact that optical parameters such as, e.g., absorbance, reflectance and scattering by skin and tissue depend very characteristically on the wavelength. When combining comparison recordings with structured illumination and additional variation of illumination wavelengths, it can be expected that detection of falsification is further improved.

Supplementary measures—particularly (but not exclusively) for detecting falsifications (otherwise known as spoofing)—are a spectral limitation of the illumination wavelength ranges and/or detection wavelength ranges and separate recording and evaluation thereof by comparing spectrally distinct recordings.

Figure 4:
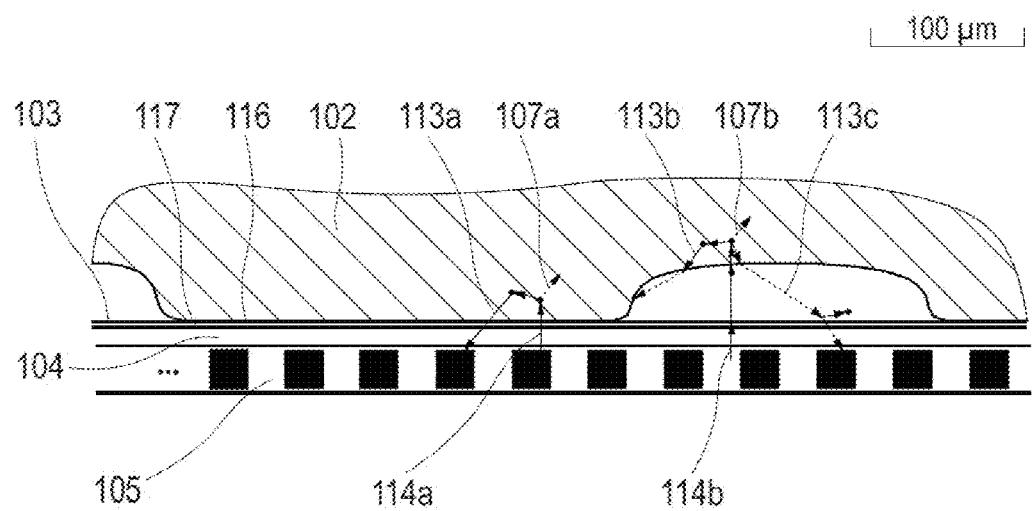
FIG. 4 is a diagram of the principal light paths during the detection of ridges and valleys.

FIG. 4 shows the principle underlying the invention for generating a high-contrast (<0.4) skin print image. The object or deposited finger 102 contacts the placement surface 103 by the skin area 116 placed thereon. Light from artificial illumination proceeds from the illumination source through the sensor layer 105, traverses an optional intermediate layer 104 with a preferably optical functionality, should such intermediate layer be provided, and passes through a protective layer 117 forming the placement surface 103.

A portion 114a of the light of the artificial illumination couples into the skin via the ridge, another portion 114b couples into the skin of the deposited finger 102 in the region of the valley.

Portions 107b of the light coupled into the valleys of the skin are scattered in the finger 102 or in the skin thereof and no longer pass out of the skin in direction of the sensor layer 105. Other portions 113b of the illumination backscattered by the finger 102 to be recorded are coupled into the skin in the valleys and coupled out at an angle such that this light component does not directly impinge on the light-sensitive elements of the sensor layer 105. A further portion 113c of the illumination backscattered by the contact region 116 of the finger 102 is coupled into the valleys and coupled out at an angle such that this portion of light impinges on the light-sensitive elements of the sensor layer 105.

The portion 113a of illumination which is reflected (or backscattered) from the skin area (contact surface 116) to be recorded and which is coupled into the skin via the ridge can pass through the placement surface 103 virtually without reflection losses and can be detected by the light-sensitive elements of the sensor layer 105. The precondition for this is a slight difference in refractive index between the deposited skin of the finger 102 and the protective layer 117 forming the placement surface 103. In all current transparent materials having a refractive index of around 1.5 (±0.2), this precondition is sufficiently met because human skin or human tissue likewise have a refractive index of approximately 1.5. Another portion 7a of the illumination which is coupled into the skin in the region of the papillary ridge is scattered in the finger 102 and does not travel in direction of the light-sensitive elements of the sensor layer 105.

Owing to the difference in refractive index between skin and air of approximately 0.5, the portion 113a of the illumination backscattered from the ridges and detected is significantly higher than the portion 113c of the light that is coupled out of the valleys and detected by the sensor layer 105. The scatter problem in its entirety can easily be calculated for different refractive indices of the protective layer 117 forming the placement surface 103 and wavelengths of the illumination. A ridge-valley contrast of 0.5 (±0.1) results for the entire optical wavelength range and a refractive index of the protective layer of 1.5 (±0.1).

The direct recording is carried out without imaging elements in a highly resolving manner under the condition that the distance between the placement surface 103 and light-sensitive elements of the sensor layer 105 is less than the mean pixel spacing defined by the pixel grid. This criterion is necessary because the CTF worsens with increasing distance due to the propagation of light between placement surface 103 and sensor layer 105.

Direct Optical Recording with High Image Quality

Figure 6:
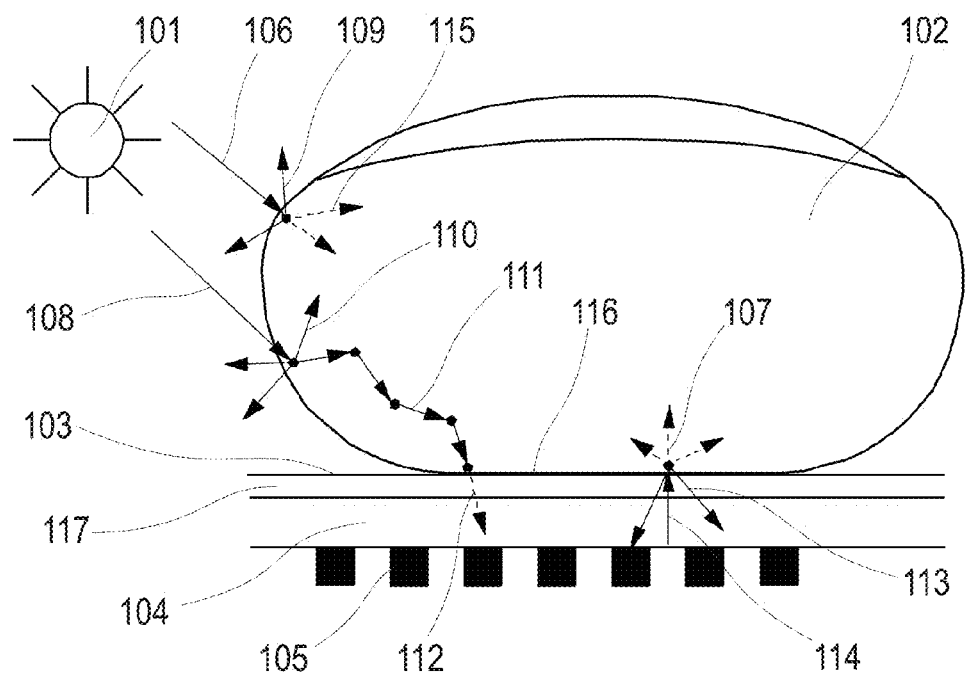
FIG. 6 is a diagram of the principal light paths of ambient light and light of the light source according to the invention.

FIG. 6 shows the basic functioning of the device according to the invention. This device is formed as a layer body. One of the layers, the sensor layer 105, has light-sensitive elements which are arranged in a two-dimensional, regular pixel grid. The layer body has a placement surface 103. The skin area 116 in question is placed on the placement surface 103 for recording. The illumination is carried out by light 114 of an artificial illumination proceeding in direction from below the placement surface 103 and by ambient light 101 proceeding in direction from above the placement surface 103 so that the reflected signal 113 is directly detected.

The contrast between ridges and valleys of the skin print 102 is essential to achieving the FBI quality standards. This contrast amounts to less than 0.1 on a simple contactless image, for example, of finger minutiae. A substantially higher ridge-valley contrast is achieved in the arrangement according to the invention.

Figure 7:
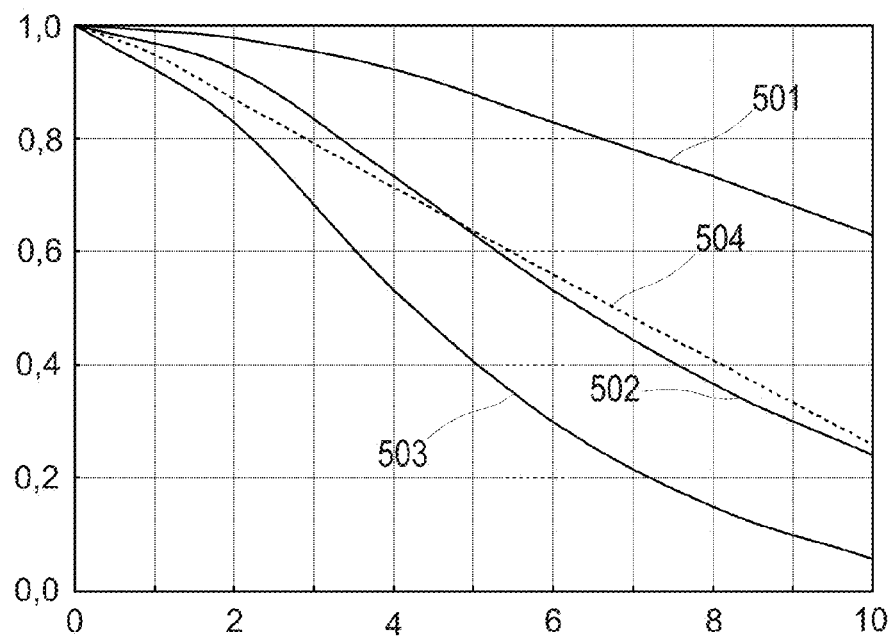
FIG. 7 shows the CTF as function of the spatial resolution (lp/mm) for different distances between the light-sensitive elements and the object to be captured.

The CTF for three specific distances, 20 μm 501, 40 μm 502 and 60 μm 503, is shown by way of example in FIG. 7. The FBI standard for 500 ppi systems is also shown as a dashed line 504. Based on the Nyquist theorem, a system of this kind requires a period, i.e., a mean pixel spacing, of at least 50.8 μm. With this value as distance between placement surface 103 and sensor layer 105, the FBI standards can no longer be met. Broadly speaking, it must be the case that the distance between the placement surface 103 and the light-sensitive elements in the sensor layer 105 is less than the mean pixel spacing.

The light-sensitive elements in the sensor layer 105 are typically photodiodes or other diodes wired as light-sensitive elements, e.g., also back-biased LEDs. The technology for wiring the diodes with transistors for reading out signals is typically CMOS or CCD. The spectral characteristic of the light-sensitive elements of the sensor layer 105 is adapted to the utilized wavelength spectrum.

Illumination and Ambient Light

The device has an artificial light source which can be selectively switched on and off individually or in groups in certain regions, individual groups of light-sensitive elements. Accordingly, it allows a structured illumination of the skin area 116 which is to be recorded. The illumination is arranged in such a way that light portions 114 are coupled into the skin area 116 to be recorded from below through the placement surface 103, all of the layers of the layer body being at least partially transparent above the light source.

The light source can be arranged under the sensor layer 105 with the light-sensitive elements. In this case, particularly the sensor layer 105 with the light-sensitive elements must have sufficient transmission. This transmission is chiefly determined by the fill factor which is formed as quotient of the total area of the light-sensitive regions and the total area of the sensor layer 105.

The goal of using of a specially structured illumination is to compensate for interfering inhomogeneous ambient light effects and inhomogeneous skin effects.

Inhomogeneous ambient light effects can occur on the one hand in that the ambient light 101 itself inhomogeneously illuminates the placement surface 103 and the skin area 116 to be recorded, for example, through direct solar radiation combined with partial shading.

Figure 5:
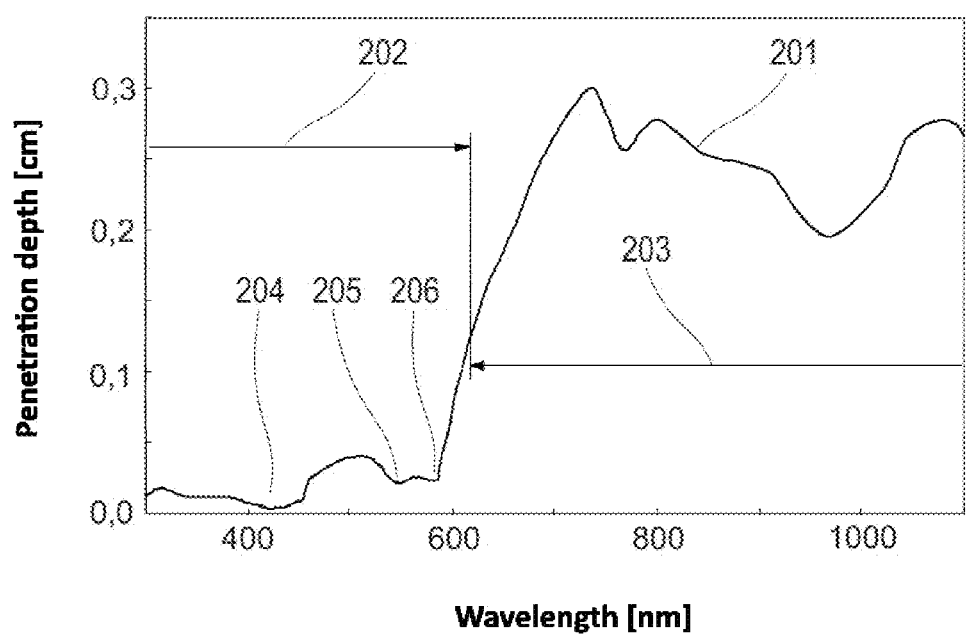
FIG. 5 is a diagram of the penetration depth of the light into human tissue as a function of wavelength.

On the other hand, inhomogeneous ambient light effects can occur through the partial transmission of ambient light through the human tissue. This effect is described by the penetration depth parameter, is wavelength-dependent and in particular causes the outer contours of the deposited skin areas to be more brightly imaged. FIG. 5 shows the penetration depth of light into human tissue as a function of wavelength. Particularly portions of ambient light with wavelengths greater than 600 nm contribute to the illumination of the deposited skin area and add together with the illumination through the artificial background illumination.

Inhomogeneous skin effects in this case refer to variations in the skin area or tissue area which result in different brightness. One example is especially dry or especially moist skin parts due, for example, to sweaty hands. Another example is tattoos which amplify or diminish reflections depending on type and color. A further example is variously strong pressure with which the skin area is pressed on the placement surface.

The aforementioned effects or inhomogeneities cause fluctuations in brightness in the image background. They can be reduced or even compensated through a selectively adapted structured illumination.

Additional Spectral Filters

In addition to the principle of structured illumination, a spectral filter can also be used to further reduce ambient light. This spectral filter should limit the wavelength spectrum to be detected to a spectral region in which the skin and underlying tissue are highly absorbent. As can be seen in FIG. 5, this absorption range 202 is between 300 nm and 600 nm. The reason for this sharply pronounced absorption range 202 consists in the three absorption bands 204, 205 and 206 of hemoglobin in the blood.

As is shown in FIG. 6, the spectral filter 104 is located between the protective layer 117 constituting the placement surface 103 and sensor layer 105. The ambient light proceeding from the sun or artificial light sources generally contains portions 106 in the wavelength range of the above-mentioned absorption range 202 (see FIG. 5). These portions 106 generate forward-scattered light 115 and back-scattered light 109 in the skin and cannot penetrate through the skin owing to the shallow penetration depth 202. Other wavelength components 108 in which skin and underlying tissue are transparent to light because of the greater penetration depth 201 are also transformed into forward-scattered light 110 and back-scattered light 111, but can propagate in the tissue due to the comparatively large penetration depth 203. A portion of the propagating light 111 propagates in direction of the light-sensitive elements in the sensor layer 105. However, this portion 112 is not detected owing to the spectral filter in the intermediate layer 104 because it is reflected or absorbed before impinging on the light-sensitive elements of the sensor layer 105.

Wavelength components which do not lie within the transmission region of the spectral filter are reflected and/or absorbed. Whether the light is absorbed or is reflected depends on the technical implementation of the filter. Two groups of filters seem suitable for this. The first group is made up of interference filters comprising a plurality of dielectric layers. Through constructive and destructive superposition of light waves, they reflect or transmit light in a determined wavelength range. Accordingly, band pass filters with half-power widths of from one nanometer to several hundreds of nm are possible. Low pass edge filters which transmit light only below a certain limit wavelength can also be implemented. Generally, interference filters have a highly spectral angular dependence. The second group is made up of colored glass filters which are comparatively usually more advantageous. They can be used in this case as band pass filters and absorb the light outside of their transmission window. They have hardly any spectral angular dependence. Bandwidths of from 50 nm up to several hundreds of nanometers are typical.

Commonly available simple filter solutions as used, e.g., in RGB sensors which block the light with wavelengths greater than 575 nm can be utilized with the solution according to the invention. Alternatively, the sensor pixels can also be configured in such a way that they are not at all sensitive to wavelengths greater than 575 nm.

Figure 8A:
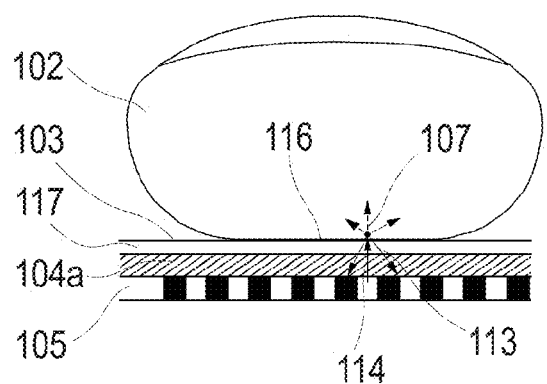
FIGS. 8A-8B illustrate embodiments of the invention, with continuous filter layer between placement surface and sensor layer (FIG. 8A) and with separately filter-coated light-sensitive elements of the sensor layer (FIG. 8B)
Figure 8B:
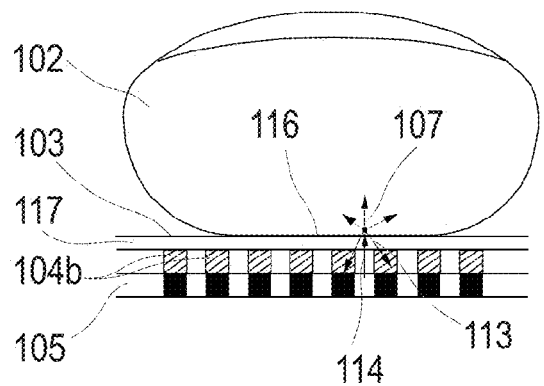

FIGS. 8A-8B show various arrangement variants of a spectral filter. FIG. 8A shows the arrangement with a closed spectral filter layer 104a between the light-sensitive elements of the sensor layer 105 and the protective layer 117 as placement surface 103. Accordingly, the light of the illumination is spectrally limited through the filter layer 104a before it reaches the deposited skinsurface. The light reflected (back-scattered) by the deposited skin area and the ambient light, including the light components thereof that reach the sensor through the deposited skin area, are likewise spectrally filtered.

FIG. 8B shows the spectral filter constructed in such a way that it is located exclusively between the light-sensitive elements and the protective layer 117 serving as placement surface 103. The light of the illumination accordingly passes between the light-sensitive elements without spectral limiting through the spectral filter, through the placement surface 103 and illuminates the deposited skin area 102 of a finger.

The light component of the illumination backscattered by the skin area 102 passes through the spectral filter to the light-sensitive elements of the sensor layer 105.

Figure 10A:
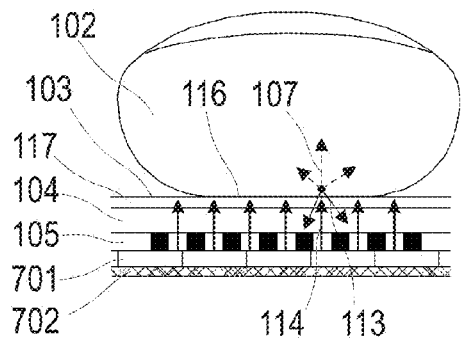
FIGS. 10A-10F show different embodiments of illumination arrangements for generating adapted structured illumination.
Figure 10B:
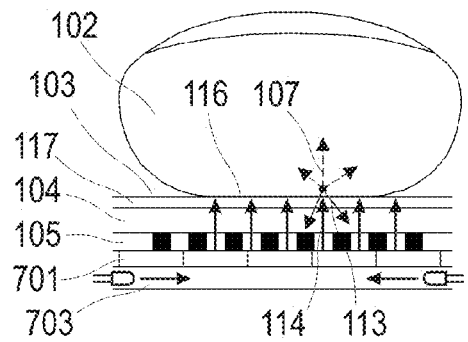
Figure 10C:
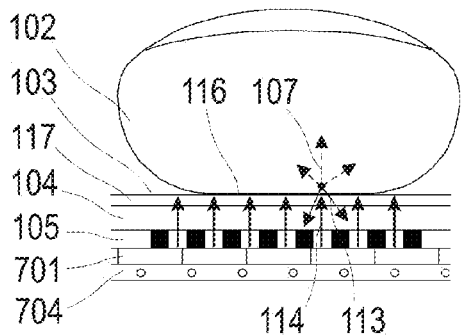
Figure 10D:
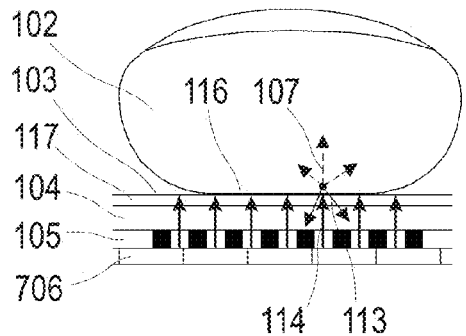
Figure 10E:
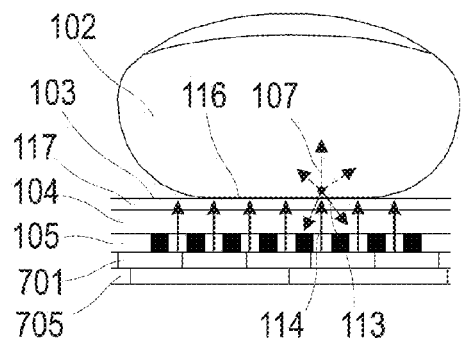

In FIGS. 10A-10F, diagram parts show constructions of the device according to the invention in which the structured illumination is generated through a layer which locally switches the transmission, for example, through a switchable liquid crystal layer. In this case, a homogeneous background illumination is needed because the switchable layer itself generates no light. As is shown in FIG. 10A, this background illumination can be a photoluminescent sheet or, as is shown in FIG. 10B, a light-guiding element in combination with LEDs or OLEDs or, as shown in FIG. 10C, a system of cold cathode elements or, as is shown in FIG. 10d, an LED array or OLED array or a two-dimensional OLED.

FIGS. 10A-10F show the device according to the invention as layer construction with a light source in the form of an illumination array with active light-emitting elements (for example, as LED matrix or OLED matrix) which are located below the sensor layer 105.

Figure 10F:
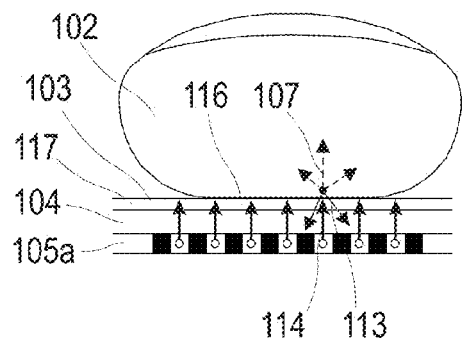

However, the light-emitting elements can also be integrated in the sensor layer 105 as is shown in FIG. 10F, i.e., can be located in the same layer as the light-sensitive elements, and form a common illumination-and-sensor layer 105a. Light-emitting elements and light-sensitive elements are then arranged so as to be offset relative to one another.

LIST OF REFERENCE NUMERALS 101 ambient light
102 skin area (object)
103 placement surface
104 intermediate layer (optional filter layer)
104a layer with optical filter covering area between the protective layer and the sensor layer
104b layer with individual optical filter elements on the light-sensitive elements of the sensor layer
105 sensor layer (with two-dimensionally arrayed light-sensitive elements)
105a sensor layer with additionally integrated light-emitting elements
106 portions of the ambient light with wavelengths <600 nm
107 light scattered in finger
107a light coupled into the skin via the ridge and scattered in finger
107b light coupled into the skin in the valley and scattered in finger
108 portions of the ambient light with wavelengths 600 nm
109 backscattered portions of the ambient light
110 portions of the ambient light with wavelengths >600 nm forward-scattered into the finger
111 light path of the ambient light characterized by scattering with wavelengths 600 nm
112 portion of the ambient light with wavelengths 600 nm that passes through the placement surface
113 portion of the illumination backscattered from the skin area to be recorded
113a portion of the illumination backscattered from the skin area to be recorded, coupled into the skin via the ridge
113b portion of the illumination backscattered from the skin area to be recorded, coupled into the skin in the valley, coupled out at an angle such that this portion of light does not impinge directly on the light-sensitive areas
113c portion of the illumination backscattered from the skin area to be recorded, coupled into the skin in the valley, coupled out at an angle such that this portion of light impinges on the light-sensitive areas
114 artificial illumination
114a artificial illumination, portion coupled into the skin via the ridge
114b artificial illumination, portion coupled into the skin in the valley
115 portions of the ambient light with wavelengths >600 nm forward-scattered into the finger
116 contact region of the object on the placement surface
117 protective layer of transparent material, e.g., polymer, glass
201 penetration depth of optical radiation into human tissue
202 wavelength range with shallow penetrating depth (<600 nm)
203 wavelength range with large penetration depth (≥600 nm)
204 Soret band (Hb absorption band at around 400 nm)
205 Hb alpha band (Hb absorption band at around 540 nm)
206 Hb beta band (Hb absorption band at around 580 nm)
301 backscattering (diffuse reflection) of optical radiation on human skin
501 CTF for a distance of 20 µm between placement surface and light-sensitive area
502 CTF for a distance of 40 µm between placement surface and light-sensitive area
503 CTF for a distance of 60 µm between placement surface and light-sensitive area
504 CTF from FBI requirements for a 500 ppi system
6 illumination pattern
701 LCD matrix
702 photoluminescent sheet
703 background illumination realized through light sources coupled laterally into light-guiding elements
704 background illumination realized through cold cathode tube elements
705 background illumination through matrix of LEDs or OLEDs optionally switchable individually
706 matrix of individually switchable LEDs or OLEDs

What is claimed is:

1. A method for optical recording of skin prints by a direct optical scanner, the method comprising:
    placing a skin area to be recorded on a placement surface of the direct scanner;
    reading out and storing image data of a calibration image from a sensor array, the calibration image being generated under homogeneous illumination from an areal light source and ambient light that may be present;
    calculating an adapted illumination pattern by applying image processing to the calibration image stored in such a way that the application of the adapted illumination pattern to the areal light source generates a two-dimensionally structured illumination pattern to minimize influence of the ambient light and to homogenize the illumination of the deposited skin print;
    controlling the areal light source with the calculated adapted illumination pattern, the areal light source being an illumination array controllable in individual light-emitting elements or in groups of light-emitting elements; and
    reading out and storing image data of an image of the deposited skin area generated during illumination with the adapted illumination pattern.

2. The method according to claim 1, wherein calculating the adapted illumination pattern from the calibration image comprises:
    calculating an image background without details of the skin print by applying image processing;

adapting image information containing at least a brightness value range and an image size to technical parameters of the illumination array; and applying image processing to scale image regions and to account for propagation characteristic of the light in the deposited skin area.

3. The method according to claim 2, wherein adapting the image information to the technical parameters of the illumination array comprises at least image processing from the group comprising scaling, offset and inversion.

4. The method according to claim 1, wherein reading out of the calibration image data and calculating the adapted illumination patterns comprise:
using an internal computing unit to read out image data of the calibration image from the sensor array, the calibration image being generated under homogeneous illumination;
storing the read-out image data in a storage module connected directly to the computing unit; and
calculating the adapted illumination pattern by applying image processing to the stored calibration image.

5. The method according to claim 1, further comprising displaying a calculated adapted illumination pattern for recording the skin prints through the controllable illumination array as a light/dark distribution.

6. The method according to claim 1, further comprising recording at least one comparison image for live finger detection, wherein the illumination array is spatially limited to a portion of the skin area to be recorded or is completely switched off to utilize ambient light in a selective manner for live finger detection.

7. The method according to claim 1, further comprising recording at least one comparison image for live finger detection, wherein the illumination array is switched off in individual regions of the skin area to be recorded to utilize image information of transitional areas between a switched on and switched off light source for live finger detection.

8. The method according to claim 1, further comprising recording at least one comparison image for live finger detection with a changed wavelength spectrum of the illumination array.

9. A device for optical recording of live skin areas, the device comprising:
a layer body having a sensor layer comprising light-sensitive elements arranged in a two-dimensional pixel grid, and a placement surface being an outer surface of the layer body parallely opposed to the two-dimensional pixel grid of the light-sensitive elements of the sensor layer and being provided for placing at least one skin area to be recorded, the layer body being formed in such a way that the light-sensitive elements are disposed at a distance from a skin area to be recorded of less than a mean pixel spacing defined by the pixel grid;
an areal light source arranged such that light components of the light source can be coupled from the direction of the sensor layer through the placement surface into the skin area, wherein all layers of the layer body disposed between the light source and the placement surface transmit at least portions of light of a predetermined wavelength range;
the areal light source comprising separately controllable regions which can be controlled individually or in groups and which allow for adaptation of a structured illumination pattern at least for the skin area to be recorded to compensate for influence and interference of ambient light of a calibration image of a skin print recorded with homogeneous illumination from the areal light source; and
a computing unit for calculating an adapted intensity distribution of the structured illumination pattern for controlling the separately controllable regions of the areal light source for generating the structured illumination pattern, the computing unit being connected to the sensor layer and to the separately controllable regions of the light source.

10. The device according to claim 9, wherein a spectral filter is provided between the light-sensitive elements and the placement surface, the spatial filter being transparent at least for wavelength components smaller than 600 nm.

11. The device according to claim 10, wherein the spectral filter is provided between the sensor layer and the placement surface over the full surface.

12. The device according to claim 10, wherein the spectral filter is only provided between the light-sensitive elements and the deposited skin area such that the illumination of the deposited skin area is not spectrally limited through the filter.

13. The device according to claim 10, wherein a band pass filter or a low pass edge filter is provided as the spectral filter.

14. The device according to claim 10, wherein the spectral filter is transparent to wavelength components of at least one hemoglobin absorption band selected from a group comprising Soret band, Hb-alpha band, and Hb-beta band.

15. The device according to claim 9, wherein the light source comprises an illumination array having regularly arranged singular light diodes in a light diode matrix, the diodes being LEDs, OLEDs and/or QLEDs.

16. The device according to claim 9, further comprising an additional light source characterized by a wavelength spectrum different than that allocated to the illumination array, the additional light source can be switched on alternatively in order to record a comparison image for live finger detection at a predetermined different comparison wavelength range.

17. The device according to claim 9, wherein the computing unit for calculating the adapted illumination is an internal computing unit arranged on a chip in common with the sensor layer and the illumination unit.

18. The device according to claim 17, wherein a storage module connected to the internal computing unit is also arranged on the common chip.

* * * * *